United States Patent
Subasic et al.

(10) Patent No.: US 8,793,252 B2
(45) Date of Patent: Jul. 29, 2014

(54) SYSTEMS AND METHODS FOR CONTEXTUAL ANALYSIS AND SEGMENTATION USING DYNAMICALLY-DERIVED TOPICS

(75) Inventors: Pero Subasic, Mountain View, CA (US); Kenin Coloma, Sunnyvale, CA (US); Guoying Zhang, Fairfax, VA (US); Jiliang Chang, Potomac, MD (US); Manu Shukla, Sterling, VA (US)

(73) Assignee: AOL Advertising Inc., Dulles, VA (US)

( * ) Notice: Subject to any disclaimer, the term of this patent is extended or adjusted under 35 U.S.C. 154(b) by 0 days.

(21) Appl. No.: 13/241,856

(22) Filed: Sep. 23, 2011

(65) Prior Publication Data

US 2013/0080434 A1  Mar. 28, 2013

(51) Int. Cl.
*G06F 17/30* (2006.01)

(52) U.S. Cl.
USPC ............. 707/738; 707/736; 707/758; 706/12; 706/14; 705/14.4

(58) Field of Classification Search
None
See application file for complete search history.

(56) References Cited

U.S. PATENT DOCUMENTS

| | | | |
|---|---|---|---|
| 6,122,647 A | 9/2000 | Horowitz et al. | |
| 6,675,159 B1 | 1/2004 | Lin et al. | |
| 7,216,121 B2 | 5/2007 | Bachman et al. | |
| 7,340,459 B2 | 3/2008 | Krohn et al. | |
| 7,644,076 B1 * | 1/2010 | Ramesh et al. | 707/999.006 |
| 7,769,767 B2 | 8/2010 | Petersen | |
| 8,078,625 B1 * | 12/2011 | Zhang et al. | 707/748 |
| 8,120,866 B2 * | 2/2012 | Che et al. | 360/31 |
| 8,615,800 B2 * | 12/2013 | Baddour et al. | 726/22 |
| 2002/0152202 A1 | 10/2002 | Perro et al. | |
| 2003/0074400 A1 * | 4/2003 | Brooks et al. | 709/203 |
| 2003/0115191 A1 | 6/2003 | Copperman et al. | |
| 2004/0123242 A1 | 6/2004 | McKibben et al. | |
| 2005/0149395 A1 * | 7/2005 | Henkin et al. | 705/14 |
| 2005/0246410 A1 * | 11/2005 | Chen et al. | 709/200 |
| 2006/0041549 A1 * | 2/2006 | Gundersen et al. | 707/5 |
| 2006/0106866 A1 * | 5/2006 | Green et al. | 707/104.1 |
| 2006/0149710 A1 | 7/2006 | Koningstein et al. | |

(Continued)

FOREIGN PATENT DOCUMENTS

WO   WO 03/019421   3/2003

OTHER PUBLICATIONS

Ayyasamy et al., "Mining Wikipedia Knowledge to improve document indexing and classification," *10th International Conference on Information Sciences Signal Processing and their Applications (ISSPA)*, May 2010.

(Continued)

*Primary Examiner* — Hung Le
(74) *Attorney, Agent, or Firm* — Finnegan, Henderson, Farabow, Garrett & Dunner, LLP

(57) ABSTRACT

Systems and methods are disclosed for contextual analysis and segmentation of information objects. According to one implementation, information objects, such as web pages and user profiles, may be analyzed to identify key terms. These key terms may be included in a contextual representation of an information object. By comparing the contextual representations of a plurality of information objects, one or more contextual segments (i.e., categories of information objects) may be created. Each contextual segment may also be associated with its own contextual representation. Once a contextual segment has been created, information objects may be assigned to the contextual segment. These contextual segments may be used to deliver targeted advertising, for example.

29 Claims, 4 Drawing Sheets

(56) References Cited

U.S. PATENT DOCUMENTS

| | | | |
|---|---|---|---|
| 2006/0282328 A1 | 12/2006 | Gerace et al. | |
| 2007/0005646 A1 | 1/2007 | Dumais et al. | |
| 2007/0073669 A1 | 3/2007 | Kraft | |
| 2007/0156669 A1 | 7/2007 | Marchisio et al. | |
| 2008/0046415 A1* | 2/2008 | Henkin et al. | 707/3 |
| 2008/0154886 A1 | 6/2008 | Podowski et al. | |
| 2008/0235187 A1 | 9/2008 | Gade et al. | |
| 2008/0243487 A1 | 10/2008 | Dayan et al. | |
| 2008/0249764 A1* | 10/2008 | Huang et al. | 704/9 |
| 2009/0019034 A1 | 1/2009 | Franks et al. | |
| 2009/0089678 A1 | 4/2009 | Sacco et al. | |
| 2009/0157652 A1 | 6/2009 | Barbosa et al. | |
| 2009/0171938 A1 | 7/2009 | Levin et al. | |
| 2009/0240674 A1 | 9/2009 | Wilde et al. | |
| 2009/0248666 A1 | 10/2009 | Ahluwalia | |
| 2009/0254540 A1 | 10/2009 | Musgrove et al. | |
| 2009/0306963 A1 | 12/2009 | Prompt et al. | |
| 2010/0058195 A1 | 3/2010 | Stefik et al. | |
| 2010/0082673 A1* | 4/2010 | Nakano et al. | 707/776 |
| 2010/0094875 A1 | 4/2010 | Harrison et al. | |
| 2010/0115615 A1* | 5/2010 | Hubbard et al. | 726/22 |
| 2010/0121790 A1* | 5/2010 | Klinkott | 706/12 |
| 2010/0131563 A1* | 5/2010 | Yin | 707/794 |
| 2010/0138271 A1 | 6/2010 | Henkin et al. | |
| 2010/0185689 A1 | 7/2010 | Hu et al. | |
| 2010/0293062 A1* | 11/2010 | Lukose et al. | 705/14.73 |
| 2011/0029511 A1* | 2/2011 | Kodialam et al. | 707/726 |
| 2011/0035379 A1* | 2/2011 | Chen et al. | 707/740 |
| 2013/0080439 A1 | 3/2013 | Subasic et al. | |

OTHER PUBLICATIONS

Besagni et al., "A Segmentation Method for Bibliographic References by Contextual Tagging of Fields," *Seventh International Conference on Document Analysis and Recognition* [Online] 2003.

Contextual Segmentation—The New Method for Market Segmentation, http://ezinearticles.com/?Contextual-Segmentation—The-New-Method-for-Market-Segmentation&id=985594 (accessed Mar. 28, 2011).

Picca et al., "Using wikipedia and supersense tagging for semi-automatic complex taxonomy construction," http://comupedia.org/adrian/articles/picca_et_al_calP07_cr.pdf Raghavan et al., "Probabilistic First Pass Retrieval for Search Advertising: From Theory to Practice," *Proceedings of the 19th ACM International Conference on Information and Knowledge Management* [Online] 2010, pp. 1019-1028.

Zhang et al., "Learning from Multi-topic Web Documents for Contextual Advertisement". *Proceeding of the 14th ACM SIGKDD International Conference on Knowledge Discovery and Data Mining* [Online] 2008, pp. 1051-1059.

Extended European Search Report for European Application No. 12006632, mailed on Mar. 8, 2013 (6 pages).

Extended European Search Report for European Application No. 12006633, mailed on Mar. 12, 2013 (6 pages).

Wai-Chiu Wong et al., "Incremental Document Clustering for Web Page Classification," XP055054749, available at http://web.archive.org/web/20060504045607/http://www.cse.cuhk.edu.hk/~adafu/Pub/IS2000.ps (May 4, 2006) [retrieved by EPO on Feb. 27, 2013] (8 pages).

"Web Search Engine," Wikipedia, XP055055084, available at http://en.wikipedia.org/w/index.php?title=Web_search_engine&oldid=451629077 (Sep. 21, 2011) [retrieved by EPO on Mar. 4, 2013] (4 pages).

Official Communication for European Application No. 12006632, mailed on Nov. 21, 2013 (5 pages).

Official Communication for European Application No. 12006633, mailed on Nov. 21, 2013 (5 pages).

* cited by examiner

SYSTEMS AND METHODS FOR CONTEXTUAL ANALYSIS AND SEGMENTATION USING DYNAMICALLY-DERIVED TOPICS

TECHNICAL FIELD

The present disclosure relates to systems and methods of contextual segmentation and analysis of information objects, such as web pages and user profiles. More particularly, and without limitation, the present disclosure relates to systems and methods for contextually analyzing and segmenting information objects using dynamically derived topics.

BACKGROUND

Contextual segmentation is a process of assigning a set of tags or labels to information objects. Information objects may include, for example, web objects, such as web pages and user profiles. Contextual tags may belong to a hierarchy, such as the Wikipedia hierarchy of categories or the Amazon product hierarchy.

Contextual segmentation may be used in a variety of ways to enhance user experiences on the Internet. Contextual segmentation is generally used in information retrieval to classify and categorize documents, as well as to enhance and refine search results. A variety of different information retrieval tasks are supported by contextual segmentation, such as general search tasks, routing, filtering, and classification of information objects, as well as higher-level processes, such as communication, language understanding, and translation.

In the context of Internet advertising, contextual segmentation may be utilized to classify and categorize web pages and user profiles to optimize targeted advertising. Web pages and user profiles may be divided into a number of categories, and advertisements may be delivered to users in a way that is optimized according to the content of a web page or the preferences of a user. Categories of web pages and user profiles may be referred to as page and user segments. Each page or user segment may have a different impact on advertising performance than other page or user segments, in accordance with their unique interests. Contextual segmentation of web pages and user profiles provides the ability to optimize advertising performance and business metrics, such as pay-per-click, revenue-per-impression, revenue-per-click, and revenue-per-action.

Existing methods of contextual segmentation suffer from a number of drawbacks. For example, many methods of contextual segmentation lack the scalability necessary to provide efficient segmentation for the ever-increasing number of web pages and users. Further, existing methods frequently use a fixed set of categories that is not updated quickly enough to respond to current events and interests.

SUMMARY

Consistent with the present disclosure, systems and methods are provided for contextually segmenting information objects, including web pages and user profiles, into a plurality of categories. Embodiments consistent with the present disclosure include systems and methods for contextually segmenting information objects into a plurality of categories, or segments, using dynamically derived topics. This and other aspects of the disclosed embodiments may overcome one or more of the problems set forth above.

In accordance with one disclosed exemplary embodiment, a system is providing for contextually segmenting information objects. The system includes a memory and a processor coupled to the memory. The processor is configured to access a plurality of information objects and generate a contextual representation of each object. Similarities between the contextual representations may then be identified. Based on these similarities, a contextual segment may be created to represent a subset of the information objects. A contextual representation may also be generated for the contextual segment.

In accordance with another exemplary embodiment, a method is provided for contextual analysis and segmentation of information objects. According to the method, a plurality of information objects is accessed and a contextual representation is generated for each object. Similarities between the contextual representations may then be identified. Based on these similarities, a contextual segment may be created to represent a subset of the information objects. A contextual representation may also be generated for the contextual segment.

According to still another exemplary embodiment, a computer readable medium is provided including instructions for contextual analysis and segmentation of information objects. When executed, the instructions perform steps to access a plurality of information objects and generate a contextual representation of each object. Similarities between the contextual representations may then be identified. Based on these similarities, a contextual segment may be created to represent a subset of the information objects. A contextual representation may also be generated for the contextual segment.

Before explaining certain embodiments of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The accompanying drawings, which are incorporated in and constitute part of this specification, and together with the description, illustrate and serve to explain the principles of various exemplary embodiments.

DETAILED DESCRIPTION

Reference will now be made in detail to the exemplary embodiments implemented according to the disclosure, the examples of which are illustrated in the accompanying drawings. Wherever possible, the same reference numbers will be used throughout the drawings to refer to the same or like parts.

Embodiments herein include computer-implemented methods, tangible non-transitory computer-readable mediums, and systems. The computer-implemented methods may be executed, for example, by a processor that receives instructions from a non-transitory computer-readable storage medium. Similarly, a system described herein may include at least one processor and memory, and the memory may be a non-transitory computer-readable storage medium. As used herein, a non-transitory computer-readable storage medium refers to any type of physical memory on which information or data readable by a processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by a processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Figure 1:
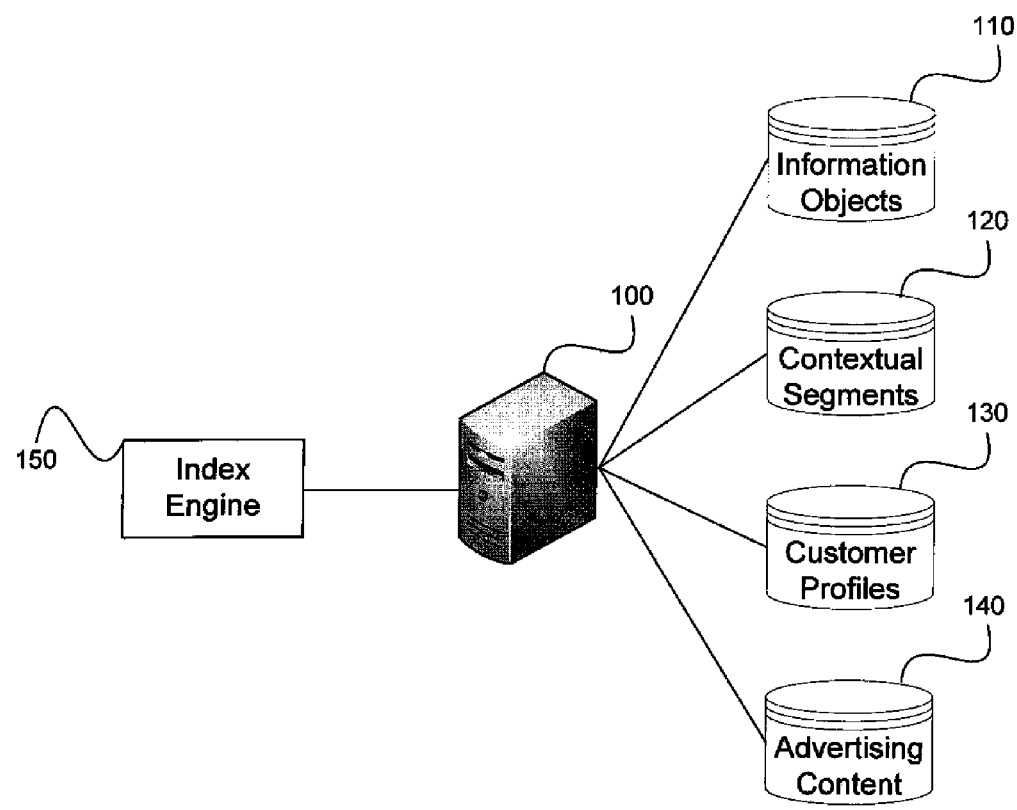
FIG. 1 is a diagram of an exemplary system environment for implementing embodiments of the present disclosure.

FIG. 1 depicts an exemplary system environment for implementing embodiments of the present disclosure. Processes associated with contextual analysis and segmentation of information objects may be performed by server 100. For example, server 100 may perform n-gram analysis of information objects and dynamic generation of topics (i.e., contextual segments), as described in embodiments of the present disclosure. In performing contextual analysis and segmentation, server 100 may communicate with various databases, such as databases 110, 120, 130, and 140, and utilize index engines 150. Server 100 and index engine 150 may be implemented as separate hardware devices that together form a processing cluster. Alternatively, index engine 150 may be implemented on server 100. Further, databases 110, 120, 130, and 140 may be components of a storage cluster. Information object database 110 may be provided for storing contextual representations of information objects, such as web pages and user profiles. Contextual segment database 120 may be provided for storing contextual representations of contextual segments (i.e., categories of information objects). Customer profile information (e.g., customer-specific contextual segments, preferences for placement of advertisements) may be stored in customer profile database 130. Advertising content (e.g., text or images to be displayed as advertisements) may be stored in advertising content database 140. Further, server 100 may utilize index engine 150, which may be implemented, for example, as a Sphinx or Solr index engine, to index information objects, in accordance with an embodiment. In addition to the components depicted in FIG. 1 and described above, other components may be provided for implementing the disclosed embodiments, as FIG. 1 is provided for illustration purposes only. These additional components may include, for example, additional index engines, servers, or server clusters. Further, these and other components may be utilized to store and process the information objects, profiles, etc. disclosed herein, as well as additional types of information objects and profiles.

While described in the context of online advertising, FIG. 1 may also be adapted for other system environments and uses. For example, the components of FIG. 1 may also be utilized for segmenting information objects to facilitate optimized searching. In other words, the various components depicted in FIG. 1 may be utilized to categorize web pages for purposes of facilitating more efficient and targeted searching by users of a search engine.

Exemplary methods and systems are described herein for contextually segmenting and analyzing information objects. The information objects may comprise, for example, web pages or user profiles. Contextual segmentation may be performed upon the information objects in accordance with one or more methods, such as by using dynamically-derived topics or by using contextual matching with an index engine, In accordance with certain embodiments, an index engine may be implemented with a Sphinx or Solr engine. In each method, information objects may be analyzed and placed into one or more categories within a hierarchy. An information object may also be assigned a score indicating the degree of relevance of the information object to a given category. Information objects may be placed into either static or dynamically-derived categories. Further, the various methods may be utilized for sorting information objects into the categories, such as contextual matching or indexing.

Several requirements may be considered for contextual segmentation and analysis. For example, the approach may be flexible in terms of both the methods used to match information objects with categories or segments and in terms of the types of information objects that may be matched. For example, approaches should be applicable to a variety of information objects associated with Internet or online advertising, such as user profiles, web pages, community profiles, etc. The approaches should incorporate widely accepted industry standards for matching contextual information, while also being appropriate for specific customer requirements. Furthermore, the approaches may also be highly scalable. In other words, the approaches should support a large number of information objects. For example, the approaches should be able to handle billions of impressions, tens of thousands of advertising campaigns, and hundreds of millions of users per day.

In accordance with certain embodiments, two general types of data may be provided as input to the contextual segmentation process: a set of information objects to be tagged and a set of tags with associated contextual definitions. Information objects may include, for example, web pages, user profiles, or advertisements. Each information object may have a contextual representation, which may be obtained by combining other objects that are associated with contextual representations. For example, the content of a web page may be sufficient to determine the contextual representation of the web page. The contextual representation of a user, or a user profile, however, may be represented by combining one or more contextual representations of other information objects. For example, in one embodiment, a user's contextual representation may be determined by reference to the browsing history of the user. In such embodiments, the contextual representations associated with one or more web pages from the browsing history of the user may be aggregated to form one contextual representation that is indicative of the user's interests, as expressed through the history of pages that the user has browsed. In alternative embodiments, a user's contextual representation may be based directly on information entered either automatically or manually by a user into a user profile.

A set of tags, or categories, with associated contextual definitions may be utilized for contextually segmenting the information objects. A tag or category may be described by a phrase, sentence, paragraph, document, set of documents, or some other contextual construct representing the tag or category. Other contextual constructs for describing tags or categories may include a set of n-grams or dictionary or thesaurus entries. Tags or categories may also belong to a hierarchy. For example, an Automobile category may include subcategories for different automobile manufacturers. Further, each of these subcategories may be divided into additional subcategories representing each model of automobile made by the particular automobile manufacturer. Alternatively or additionally, an Automobile category may include subcategories for different classes of automobiles, such as Luxury, Hybrid, Electric, Compact, Sports Utility, etc. The type and quantity of categories may be based on, for example, manual user input or may be determined automatically and dynamically in response to developing user interests, as will be described in further detail herein.

Whereas the inputs into the contextual segmentation process may include a set of information objects and a set of tags or categories, the outputs of the process may include the association of information objects with tags or categories. In addition, the outputs may include scores, which may indicate the degree to which a given tag or category relates to the information object. For example, a score from 0 to 10 may be associated with an output. A score of 9.5 may indicate that an information object is likely tightly correlated with a particular category. A score of 3.4 may indicate that the information object is loosely correlated with the particular category. Accordingly, whereas the association of a tag or category with a particular information object may indicate that the information object is to at least some extent correlated with that tag or category, the score associated with the output may more specifically quantifies this correlation.

In accordance with certain embodiments, an exemplary process of contextual segmentation and analysis may proceed as follows. An information object, such as a web page, may be input for analysis. Based on the content of the web page, such as the title, text, metadata, or any other content associated with the web page, a contextual representation of the web page may be determined. As discussed above, this contextual representation may be comprised of phrases, sentences, documents, etc. Further, this contextual representation may be based on n-gram analysis of the content of the web page. For images present on a web page, text-recognition or another analysis may be performed to identify n-grams, phrases, etc. that may be combined with other content extracted from the web page to affect the contextual representation of the web page. The determined contextual representation of the web page may be used to determine one or more categories to which the web page relates. For example, n-gram analysis may return several key terms from the text of a web page that indicate that the page relates to one or more categories. Based on the strength of this relationship, the object-category pair is assigned a score.

The one or more categories, along with associated scores, may be used to affect placement of advertisements. In one embodiment, advertisements may be selected for placement on a web page for view by all users who visit the web page based on category and score information associated with the web page. For example, all users who view a web page that is identified as relating to the Automobile category may be shown an advertisement pertaining to Automobiles. In an alternative embodiment, advertisements may be selected for placement on a web page based on a user profile associated with a particular user who is viewing the web page. For example, if a user who typically views web pages pertaining to Automobiles is viewing a web page pertaining to Movies, an advertisement pertaining to Automobiles may be displayed to that user when that user views the web page pertaining to Movies, even though the web page pertaining to Movies may have no correlation with the Automobile category. Accordingly, in such embodiments, different users of the same page may be shown different advertisements based on their user profiles, rather than on the content of the web page.

Like web pages and user profiles, advertisements may also be assigned to categories or tags and scored based on contextual segmentation and analysis. Advertisements may be contextually segmented according to a similar process to that described above with respect to web pages and user profiles. For example, a contextual representation may be developed for an advertisement based on n-grams, phrases, sentences, etc. appearing in the advertisement. For advertisements comprised entirely of one or more image files, text-recognition or other analysis may be utilized to extract text from the advertisement that may be used to create a contextual representation of the advertisement. These contextual representations may then be matched with one or more categories. As with web pages and user profiles, scores may then be assigned to the advertisement-category pair indicating the strength of the relationship between the advertisement and the category (i.e., how related the advertisement is to the category). Based on the determined categories and assigned scores for the advertisement, the advertisement may be distributed in a manner that will optimize revenue related to the advertised goods or services. For example, similar to the above-discussed example, an advertisement that has been assigned to an Automobile category may be displayed on a web page that has been determined to relate to the Automobile category to all users to who view the web page. Alternatively, the advertisement may be displayed on a web page, regardless of the content of the web page, to users with an interest in the Automobile category, as reflected in the users' browsing histories.

Information objects may be segmented according to, for example, n-gram analysis. To address evolving user interests, objects may be segmented using dynamically-derived topics. Information objects may also be segmented based on contextual matching with an index engine, such as a Sphinx or SoIr engine. Furthermore, objects may be segmented into different categories according to a hierarchy, such as the Wikipedia category hierarchy.

The above approaches for segmenting information objects may be utilized concurrently or alternatively. For example, information objects may be contextually segmented using n-gram analysis and assigned to categories derived from the Wikipedia category hierarchy. Categories may also be derived dynamically to respond to rapidly changing user interests (e.g., in response to current events) and then assigned information objects using an index engine, such as a Sphinx or SoIr engine.

Various embodiments, consistent with the present disclosure, may be implemented for contextual segmentation of information objects. For example, according to a first embodiment, contextual representations of information objects may be derived using n-gram analysis. These contextual representations may be matched to contextual segments by matching n-grams or other textual descriptions associated with the information objects with n-grams or other textual descriptions associated with the contextual segments. For example, terms associated with an information object (i.e., terms from the contextual representation of the information object) may be compared to a set of terms associated with different contextual segments (i.e., categories). The information object may then be determined to relate to one or more contextual segments if the number of matches between terms in the contextual representation and the contextual segment rises above a threshold.

Representations of contextual segments may be developed manually, automatically, or by combining both manual and automatic methods. According to one embodiment of a manual method of developing contextual segments, a contextual segment (i.e., category) may be associated with a set of phrases or advertising keywords. The phrases or keywords may be manually assigned by an individual to the contextual segment. For example, an administrator of a system providing contextual segmentation and analysis (i.e., an individual associated with a company that provides advertising space to businesses) may manually define phrases, keywords, or other text associated with a contextual segment. The administrator may create a profile for a contextual segment and associate terms with the contextual segment. The administrator may modify the terms associated with the contextual segment based on changes in content associated with the segment or based on user needs (e.g., the needs of customers seeking to place ads associated with those segments).

Customer profiles may also be provided to enable a customer (e.g., a business seeking to associate its ads with information objects) to control the categories with which its advertisements may be associated. Accordingly, a customer may create and modify its customer profile to designate certain contextual segments as relevant to its advertisements. Further, for each contextual segment, the customer may manually define the phrases, keywords, or other text associated with the segment. By enabling customers to identify specific segments as relevant to their advertisements and to define the contextual representations associated with those segments, customers' advertisements may be more effectively placed. In other words, associating a customer's advertisements with contextual segments that have been defined specifically by the customer may result in more optimized advertisement placement (e.g., in terms of revenue derived from user selection of the advertisements) than by associating the customer's advertisements with segments defined more generally by, for example, an administrator. Of course, customer-defined categories and their respective contextual representations may be used either alternatively to or along with general categories and representations developed by an administrator or other individual or entity to apply to advertisements developed to serve a plurality of customers.

Automatic methods may also be provided for associating terms with a contextual segment. According to one embodiment of an automatic methods, information objects may be associated either manually or automatically with a contextual segment. Each of these information objects may then be analyzed to derive a set of n-grams, phrases, or other text that may then be associated with the segment with which the information object is associated. For example, a web page may be analyzed to determine a set of n-grams, keywords or phrases that are representative of the content in the web page. These n-grams, keywords, or phrases may then be assigned to the contextual segment. By aggregating key terms (e.g., n-grams, keywords, phrases) derived from a plurality of information objects associated with a contextual segment, a contextual representation of the segment may be developed. As more and more information objects associated with a segment are analyzed, the contextual representation may develop to include more and more terms representative of the segment, thus enhancing the ability to effectively match information objects with segments.

As discussed above, automatic methods for developing representations of contextual segments may include analyzing information objects to derive a set of n-grams associated with the information objects. N-grams are sequences of exactly n terms. Accordingly, an information object (e.g., web page) may be analyzed to derive a set of n-grams comprised of, for example, five terms. Based on how often each of the five-term n-grams appears in the information object, certain of the five-term n-grams may be identified as key terms. Identification of key terms may be based on, for example, the number of key terms exceeding some predefined threshold, which may be set by a user, such as an administrator. These key terms may then be associated with the contextual representation of the document and, in turn, associated with the contextual representation of one or more contextual segments to which the information object belongs.

In order to develop a representation of an information object, the information object may be first pre-processed to generate a list of n-grams, phrases, or other terms. For web pages, this process may comprise analyzing the text of a web page, along with any metadata associated with the web page, to identify a list of key terms representative of the web page. For a user or user profile, this process may entail analyzing a plurality of web pages from the user's browsing history to identify a list of key terms aggregated from analysis of each of the individual web pages. Text-recognition algorithms may also be utilized to derive key terms relating to the images of a web page. In addition to n-gram analysis, as discussed above, key words or phrases may be identified from a web page based on delimiters such as spaces, commas, periods, quotation marks, etc.

Each of the n-grams, phrases, or other terms identified for the web page during pre-processing may be associated with a weight. Applying weights to terms identified for an information object ensures that terms from certain portions of the information object are given greater consideration when associating the information object with a category. For example, terms obtained from the title, header, or top of a web page may be given a greater weight and, thus, have a greater impact on the assignment of the information object to a category than terms obtained from the body of the information object. Metadata associated with an information object, such as the title, keyword, and description metatags of a web page, may also receive higher weight than terms occurring only in the body of a web page. Further, terms that appear more frequently in the information object may be weighted higher than terms that appear less frequently. The pre-processing (i.e., identification and weighting of terms) may be implemented as a distributed job, a Hadoop job, MPI job, or through any other suitable technique of analyzing and extracting key terms from an information object.

As discussed above, a contextual representation of a contextual segment may be developed manually (e.g., by a user who inputs terms associated with the contextual segment) or automatically (e.g., by aggregating the contextual representations of information objects associated the contextual segment). Once a contextual representation of a contextual segment has been developed, that representation may used to determine whether a candidate information object should be associated with the segment. To make this determination, the contextual representation of a segment may be compared with the contextual representation of the candidate information object. If their contextual representations are sufficiently similar, then the candidate information object is associated with the contextual segment.

The contextual representations of an information object and a segment may be considered to match if they share a sufficient number of key terms. For example, if the list of key terms associated with the representation of the information object and the list of key terms associated with the representation of the segment share a minimum number of identical terms, the information object may be designated as associated with the segment. Accordingly, a threshold number of term matches may be either manually or automatically designated. When the number of matches between key terms between the representations of the information object and segment exceeds the threshold, the information object may be designated as associated with the segment. Weights associated with the key terms may also factor into the determination of whether the information object should be designated as associated with the segment. For example, a threshold weight may be either automatically or manually designated. Accordingly, an information object may be designated as associated with a segment upon the total weight of matching terms exceeding the threshold weight. Thus, an information object may be identified as associated with a segment based on a smaller number of term matches if the matching terms are of high relevance for the segment. Likewise, an information object may be identified as associated with a segment despite having similar terms of relatively lower relevance for the segment if there are a higher number of such matches.

Upon designating an information object as a match for a contextual segment, a weight may be assigned to the information object as a whole representing the strength of the relationship between the information object and the contextual segment. Accordingly, a weight may be assigned to a term to designate the term's importance within an information object or category, and a separate weight may be assigned to the information object as a whole to represent the degree to which the information object relates to a contextual segment. Further, just as the contextual representation of an information object may contain separate terms, each with separate weights identifying the degree to which a term represents the information object, an information object may be related to several contextual segments, and the degree to which each information object may is related to a contextual segment may be represented by a weight. Accordingly, an information object may be assigned to a plurality of contextual segments, and each segment may be assigned a different weight for the information object to designate how strongly the information object relates to the contextual segment.

Figure 2:
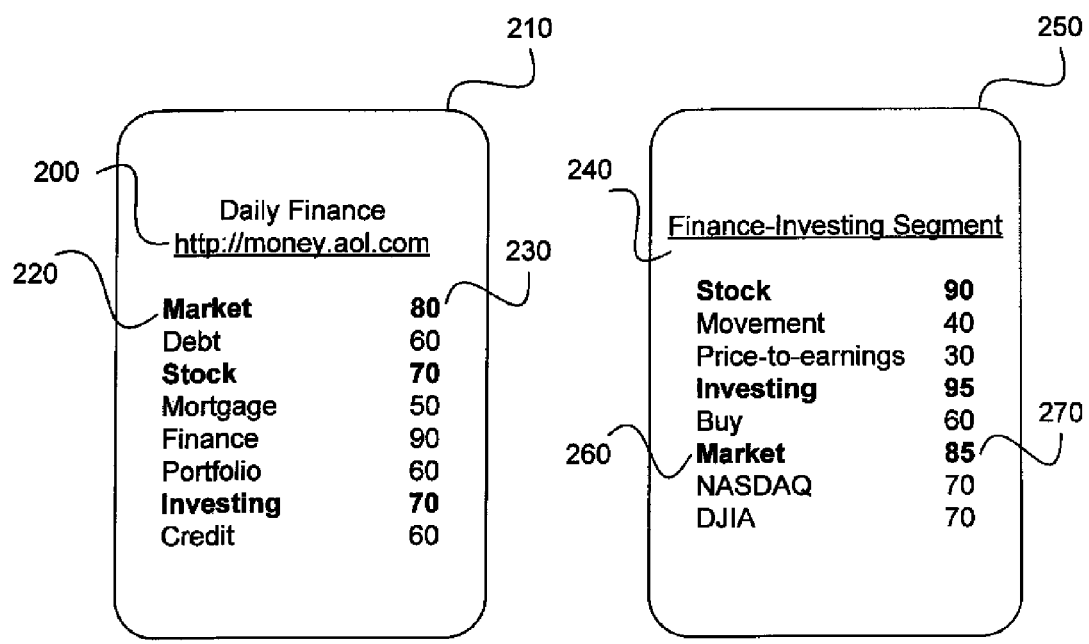
FIG. 2 is a diagram illustrating exemplary contextual representations of an information object and a contextual segment, in accordance with an embodiment of the present disclosure.

For purposes of illustration, FIG. 2 depicts exemplary contextual representations of an information object and an exemplary contextual segment produced, in accordance with an embodiment of the present disclosure. The "Daily Finance" web page 200 is represented by contextual representation 210. The Finance-Investing contextual segment 240 is represented by contextual representation 250. Both contextual representation 210 and contextual representation 250 contain lists of key terms, such as Market 220 and Market 260, and associated weights, which are represented by reference numbers 230 and 270. Each of the key terms listed in contextual representations 210 and 250 may be obtained by one of the methods described above for pre-processing information objects and contextual segments, such as n-gram analysis. Further, as described above, each of the weights, such as the weights indicated by reference numbers 230 and 270, represents the degree of association between the information object or contextual segment and the corresponding key term. In FIG. 2, the terms Market, Stock, and Investing have been bolded to indicate those terms appear in both the contextual representation 210 of the Daily Finance information object 200 and the contextual representation 250 of the Finance-Investing contextual segment 240. Depending on the threshold set for determining matches between information objects and contextual segments, information object 200 and information object 240 may be deemed to match. If so, the Daily Finance information object 200 may be assigned to the Finance-Investing contextual segment 240.

According to a second and still further embodiment, information objects may be contextually segmented using dynamically-derived topics. Thus, rather than assigning objects to contextual segments that have been predefined (e.g., by an administrator or other user), objects may be assigned to contextual segments that are not pre-defined, but rather are created dynamically. Dynamically-derived topics may be used to address the emergence of new segments (i.e., new categories of information objects) that have not been pre-defined and to analyze the impact of those new segments on advertising. Dynamically-derived topics may be created in response to current events. For example, a new topic (i.e., contextual segment) may be created or defined if analysis of information objects reveals that a large number of information objects suddenly relate to a particular natural disaster, election, or sporting event. Whereas each of these events may fit into general topics, such as weather, politics, and sports, topics relating to particular events, such as a particular football game (e.g., Super Bowl, BCS National Championship Game), may be created to tailor advertisements to information objects associated with those specific events. Topics may also be dynamically derived to represent categories of information objects that simply are not as popular as other categories. For example, certain web pages may pertain to subject matter of interest to only a small segment of viewers. Accordingly, it may be unlikely that a contextual segment has pre-defined to represent that subject matter. By creating topics or segments dynamically, information objects may be assigned to a more diverse set of segments and, thus, provide for more tailored advertising pertaining to each segment.

In addition to providing a more diverse set of contextual segments to which information objects may be assigned, dynamically-derived topics may also be used to detect topic trends on both the publisher side and the advertiser side. In other words, dynamically-derived topics may detect trends in the type of content that is being published on web pages and also detect trends in the types of advertisements that are being distributed for display on those web pages. This information may provide a benefit to publishers and advertisers. For example, advertisers may user information regarding trends in content that is being published to better cater their advertisements to the viewers of the content.

Dynamic generation of topics may occur at a period that is manually set by an individual, such as an administrator, or suddenly upon request by the individual. Alternatively, topics may be generated dynamically in response to a determination that the content being viewed by users is suddenly or rapidly changing.

In accordance with an embodiment, a process of dynamically generating topics may include: the generation of contextual representations of information objects; the generation of contextual representations of contextual segments; and the assignment of information objects to contextual segments. To generate contextual representations of the information objects, the information objects may be analyzed, so that a contextual representation for each information object may be generated. As discussed above, the contextual representations may be comprised of a set of features, such as terms (e.g., n-grams, phrases) and associated weights. Weights associated with a term may be based on the frequency with which that term appears within the information object, the portion of the information object from which the term was obtained, or any other method for determining the relevance of the term to the particular information object.

In the above embodiment, to generate contextual representations of the contextual segments, a model may be built using a fast training algorithm (e.g., a distributed pLDA algorithm) suitable for automated topic generation. Using the selected algorithm, a finite set of topics or contextual segments and associated terms and weights may be generated. The number of contextual segments to generate using the selected algorithm may be set in advance prior to running the algorithm. Further, as segments are generated dynamically and, thus, are not static or pre-defined, each segment is assigned an abstract label. Accordingly, each segment will be represented by a label that does not necessarily represent a specific, predefined concept, but rather a mixture of concepts discovered from the information object set on which the segment was based.

For example, in the first embodiment, the Automobile segment (i.e., category) may be predefined by an administrator or customer. A contextual representation of the Automobile segment may be developed by aggregating the contextual representations of information objects (e.g., web pages, user profiles) that are associated with Automobiles. The contextual representation of the Automobile segment may also be manually defined according to input from a user, such as an administrator or business customer. By contract, in the second embodiment, categories are not static or pre-defined, but rather are dynamically generated. Periodically, or in response to a sudden shift in user interests, an algorithm may be run to generate a new set of dynamically-derived topics based on analysis of information objects. A new segment may be created based upon a threshold number of information objects possessing sufficiently similar contextual representations. Optionally, the new segment may be created only if the contextual representations of the information objects are sufficiently dissimilar from the contextual representations of pre-existing, pre-defined contextual segments. Upon creation of the new dynamically-derived contextual segment, the segment as assigned an abstract label. Rather than comprising a descriptive name, such as Automobiles, Sports, or Health, the abstract label may comprise some generic identifier, such as the date on which the topic was generated. For example, a first segment dynamically generated on Aug. 1, 2011 may be represented by the label "t1_08012011." After the dynamic generation of topics is completed, a user may manually edit the abstract label to replace the label with a more descriptive term in light of the key terms associated with the segment as shown in the segment's contextual representation.

With respect to assigning information objects to contextual segments, information objects may be assigned to the dynamically-derived contextual segments. As discussed above with respect to the first embodiment, assignment of information objects to contextual segments may be based on a comparison of the contextual representations of the information objects to the contextual representations of the contextual segments. In contrast, in the second embodiment, the segments to which the objects are assigned are generated dynamically and represented by an abstract label.

Figure 3:
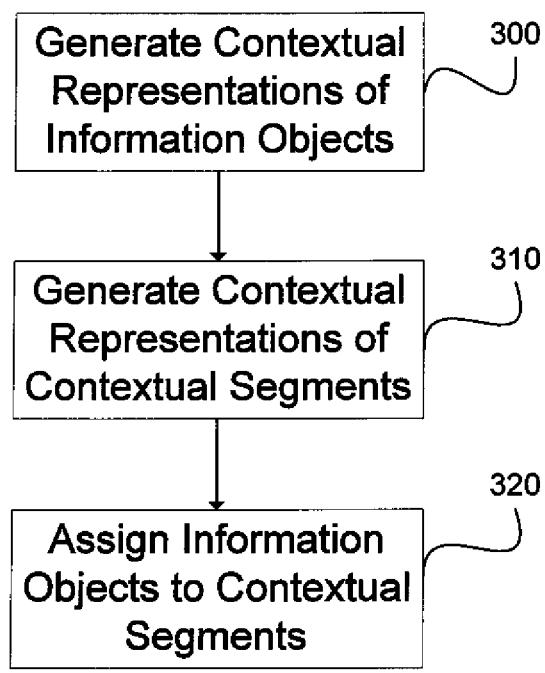
FIG. 3 is a flow diagram depicting an exemplary method for dynamically-deriving topics, in accordance with an embodiment of the present disclosure.

FIG. 3 depicts a flow diagram of an exemplary method for dynamically-deriving topics in accordance with the second embodiment. In step 300, contextual representations of information objects may be generated, such as contextual representation 210 of information object 200. In step 310, contextual representations of contextual segments may be generated, such as contextual representation 250 of contextual segment 240. After the contextual representations of the information objects and contextual segments have been generated, they may be compared with one another to determine which information objects should be assigned to which segments. Based on this comparison, the information objects may be assigned to contextual segments at step 320.

In a third and yet another embodiment, an information object may be matched to an contextual segment using matching approaches typical for search and information retrieval tasks (e.g., algorithms used by web search engines to locate results pertaining to a search query). Similar to the approaches described above with respect to the first and second embodiments, the contextual representation of a contextual segment may be comprised of a number of terms and weights. The contextual representation of information objects may also be represented by a number of terms and weights. Accordingly, an information object may be pre-processed to derive the set of terms and associated weights for the information object. The information objects are then indexed using an index engine, such as a Sphinx or Solr engine. After the information objects have been indexed, a first term from the contextual representation of a contextual segment is submitted against the index of information objects to determine which information objects match the term. Based on the results, a list of information objects returned for the term is maintained. This process repeats for each term in the contextual representation of the contextual segment until all terms associated with the contextual representation of the contextual segment have been submitted against the index of information objects. Each time a matching information object is identified, that object is added to the list of information objects originally created for the first term. Once the process has been completed for each term in the contextual representation of the contextual segment, the result will be a complete list of information objects that relate to any of the terms associated with the contextual representation of the contextual segment.

For each contextual segment, "hits" (i.e., matching information objects) may be scored (i.e., weighted) separately to indicate the degree to which each information object relates to the contextual segment. The score assigned to an information object for a particular segment may be based on, for example, the number of terms shared by the contextual representations of the information object and the particular segment (i.e., the total number of hits accumulated above). The score may also take into consideration weights assigned to each of the matching terms. Accordingly, an information object that is returned as a hit for three highly-weighted terms may be assigned a higher score than an information object that is returned as a hit for three lowly-weighted terms.

Once all hits or information objects have been scored, a select number of information objects may be deemed most relevant using a thresholding algorithm. In accordance with certain embodiments, thresholding may be performed based any of the following criteria: top K information objects by score are selected; top P % of all retrieved information objects by score are selected; and/or top P1% of top scored information objects are selected. In addition, other algorithms may be applied to determine the most relevant information objects for a contextual segment, such as detecting a maximal drop or relative drop in score between a certain number of subsequent information objects.

Figure 4:
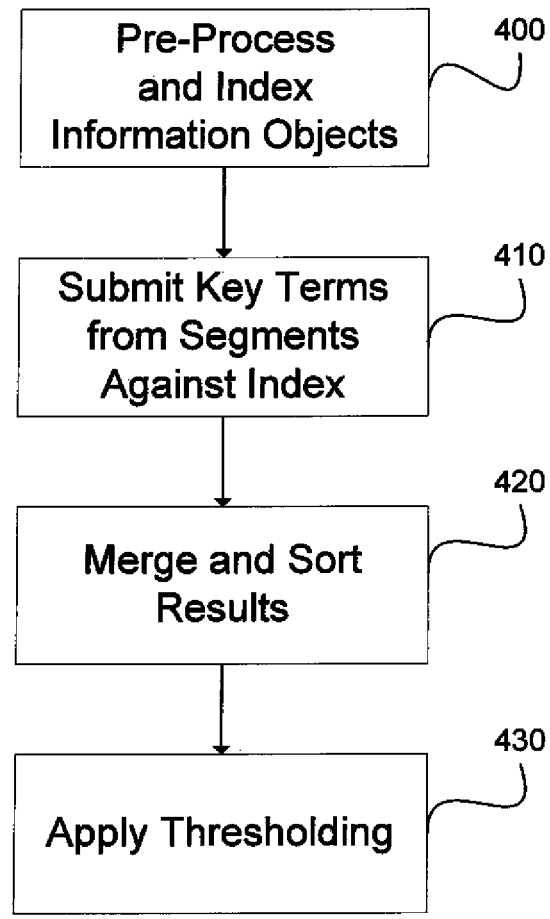
FIG. 4 is a flow diagram depicting an exemplary method for contextually segmenting information objects using contextual matching, in accordance an embodiment of the present disclosure.

FIG. 4 illustrates a flow diagram depicting an exemplary method for contextually segmenting information objects using contextual matching in accordance with the third embodiment. In step 400, information objects may be pre-processed and indexed using an index engine. Key terms from the contextual representation of n contextual segment are then submitted against the index at step 410. In step 420, the results from step 410 are merged and sorted, so that all hits retrieved for all terms submitted against the index are organized together. Finally, in step 430, a thresholding algorithm is applied to select the most relevant information objects for the contextual segment.

In a still further and fourth embodiment, information objects may be analyzed and assigned to segments in accordance with a hierarchy, such as the Wikipedia category hierarchy. As discussed above in conjunction with, for example, the first and second embodiments, contextual segments (i.e., categories) may be either pre-defined by a user or generated dynamically. In the fourth embodiment, the contextual segments with which information objects may be associated correspond to a pre-defined category-concept hierarchy based on a snapshot of Wikipedia.

In order to build a hierarchy of categories, an initial index of all Wikipedia articles may be compiled. As each article is processed, a category map, page map, redirect map, and related map may be generated. Once all articles have been processed, redirects are resolved, and the related map is used to produce and interlinking map. Next, a concept rank is computed from the interlinking map, and a category rank is computed by propagating the concept map up the hierarchy. Based on the rank and content of each article, certain articles may be filtered out of consideration. Similarly, terms associated with articles may also be filtered out when those terms are of low weight for a given article. After articles and terms of low weight are filtered out, new category maps may be generated based solely on the articles and terms that passed the above filtering steps. A new index is also created using only concepts that passed this filtering. Once the complete concept-category hierarchy is created, information objects may be associated with categories in similar fashion as described above, for example, with respect to the first and third embodiments.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, advantageous results still could be achieved if steps of the disclosed techniques were performed in a different order and/or if components in the disclosed systems were combined in a different manner and/or replaced or supplemented by other components. Other implementations are within the scope of the following exemplary claims.

Therefore, it is intended that the disclosed embodiments and examples be considered as exemplary only, with a true scope of the present disclosure being indicated by the following claims and their equivalents.

What is claimed is:

1. A method of contextual analysis and segmentation of information objects, comprising the following operations performed by at least one processor:

accessing a plurality of information objects;

generating a contextual representation for each of the plurality of information objects;

identifying, using a processor, similarities between the contextual representations;

based on the identified similarities, creating a plurality of contextual segments, each of the plurality of contextual segments representing a subset of the plurality of information objects;

generating a contextual representation for each contextual segment, wherein the contextual representation for each contextual segment comprises a plurality of key terms aggregated from the plurality of information objects represented by the contextual segment and a plurality of weights associated with each of the plurality of key terms; and assigning at least one information object to the at least one each contextual segment.

2. The method of claim 1, wherein the plurality of information objects comprises a plurality of web pages.

3. The method of claim 1, wherein the plurality of information objects comprises a plurality of user profiles.

4. The method of claim 3, wherein each of the plurality of user profiles is comprised of a plurality of web pages obtained from a browsing history of a user.

5. The method of claim 1, wherein generating a contextual representation for each of the plurality of information objects comprises identifying a plurality of key terms associated with each of the plurality of information objects.

6. The method of claim 5, wherein generating a contextual representation for each of the plurality of information objects further comprises assigning a weight to each of the key terms associated with each of the plurality of information objects.

7. The method of claim 6, wherein the assigned weight is based on a frequency that the key term appears in the information object.

8. The method of claim 6, wherein the assigned weight is based on a location within the information object from which the key term was obtained.

9. The method of claim 5, wherein identifying similarities between the contextual representations comprises comparing the pluralities of key terms.

10. The method of claim 1, wherein generating a contextual representation for each of the plurality of information objects comprises generating n-grams from each of the plurality of information objects and identifying key n-grams to include in each of the contextual representations.

11. The method of claim 1, wherein creating the plurality of contextual segments comprises creating each contextual segment upon determining that a number of identified similarities between the contextual representations exceeds a threshold value.

12. The method of claim 1, wherein assigning the at least one information object to the each contextual segment comprises assigning at least one information object from the plurality of information objects to each contextual segment.

13. The method of claim 1, wherein assigning the at least one information object to each contextual segment comprises assigning at least one information object not present in the plurality of information objects to each contextual segment.

14. A system of contextual analysis and segmentation of information objects, comprising:

a memory; and a processor coupled to the memory and configured to:

access a plurality of information objects;

generate a contextual representation for each of the plurality of information objects;

identify similarities between the contextual representations;

based on the identified similarities, create a plurality of contextual segments, each of the plurality of contextual segments representing a subset of the plurality of information objects; and generate a contextual representation for each contextual segment, wherein the contextual representation for each contextual segment comprises a plurality of key terms aggregated from the plurality of information objects represented by the contextual segment and a plurality of weights associated with each of the plurality of key terms; and assign at least one information object to the at least one each contextual segment.

15. The system of claim 14, wherein the processor is further configured to access a plurality of information objects comprising a plurality of web pages.

16. The system of claim 14, wherein the processor is further configured to access a plurality of information objects comprising a plurality of user profiles.

17. The system of claim 14, wherein the processor is further configured to access a plurality of information objects comprising a plurality of user profiles, wherein each of the plurality of user profiles is comprised of a plurality of web pages obtained from a browsing history of a user.

18. The system of claim 14, wherein the processor is further configured to generate a contextual representation for each of the plurality of information objects by identifying a plurality of key terms associated with each of the plurality of information objects.

19. The system of claim 18, wherein the processor is further configured to generate a contextual representation for each of the plurality of information objects by assigning a weight to each of the key terms associated with each of the plurality of information objects.

20. The system of claim 19, wherein the processor is further configured to assign a weight to each of the key terms based on a frequency that each of the key term appears in the information object.

21. The system of claim 19, wherein the processor is further configured to assign a weight to each of the key terms based on a location within the information object from which each of the key terms was obtained.

22. The system of claim 18, wherein the processor is further configured to identify similarities between the contextual representations by comparing the pluralities of key terms.

23. The system of claim 14, wherein the processor is further configured to generate a contextual representation for each of the plurality of information objects by generating n-grams from each of the plurality of information objects and identifying key n-grams to include in each of the contextual representations.

24. The system of claim 14, wherein the processor is further configured to create the plurality of contextual segments by creating each contextual segment upon determining that a number of identified similarities between the contextual representations exceeds a threshold value.

25. The system of claim 14, wherein the processor is further configured to assign at least one information object from the plurality of information objects to each contextual segment.

26. The system of claim 14, wherein the processor is further configured to assign at least one information object not present in the plurality of information objects to each contextual segment.

27. A computer-readable storage medium including instructions for contextual analysis and segmentation of information objects, which, when executed, perform steps comprising:

accessing a plurality of information objects;

generating a contextual representation for each of the plurality of information objects;

identifying similarities between the contextual representations;

based on the identified similarities, creating a plurality of contextual segments, each of the plurality of contextual segments representing a subset of the plurality of information objects;

generating a contextual representation for each contextual segment, wherein the contextual representation for each contextual segment comprises a plurality of key terms aggregated from the plurality of information objects represented by the contextual segment and a plurality of weights associated with each of the plurality of key terms; and assigning at least one information object to the at least one each contextual segment.

28. The computer-readable storage medium of claim 27, wherein the step of generating a contextual representation for each of the plurality of information objects comprises generating n-grams from each of the plurality of information objects and identifying key n-grams to include in each of the contextual representations.

29. The computer-readable storage medium of claim 27, wherein the step of creating the plurality of contextual segments comprises creating each contextual segment upon determining that a number of identified similarities between the contextual representations exceeds a threshold value.

* * * * *